Nov. 23, 1971  H. D. FOUST  3,621,673
AIR-CONDITIONING SYSTEM WITH COMBINED CHILLER AND ACCUMULATOR
Filed Dec. 8, 1969
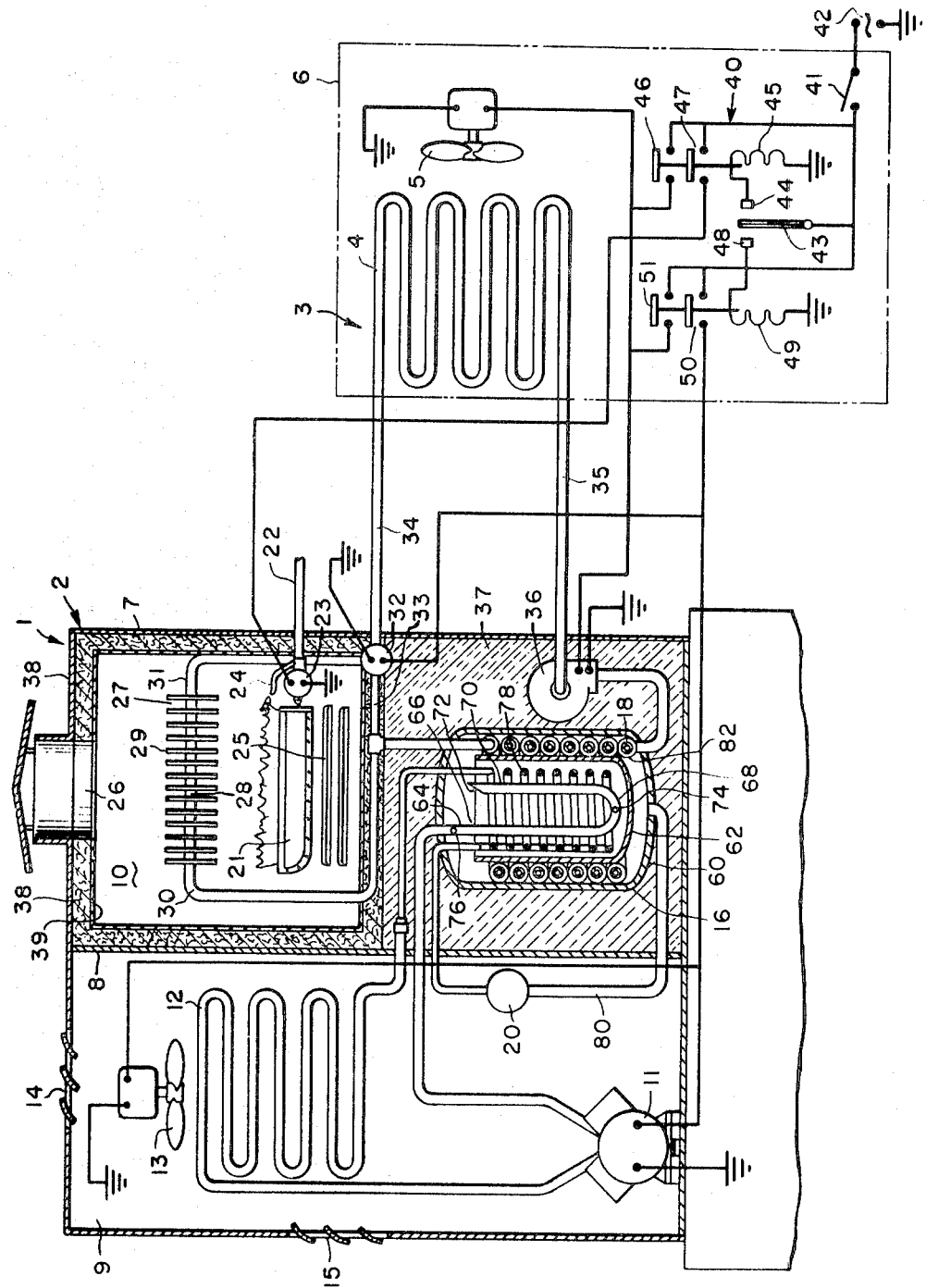
INVENTOR.
HARRY D. FOUST
BY Carl M. Lewis
ATTORNEY United States Patent Office 3,621,673
Patented Nov. 23, 1971

3,621,673
AIR-CONDITIONING SYSTEM WITH COMBINED
CHILLER AND ACCUMULATOR
Harry D. Foust, Dakota, Minn., assignor to The Trane
Company, La Crosse, Wis.
Filed Dec. 8, 1969, Ser. No. 883,140
Int. Cl. F25b 43/00
U.S. Cl. 62—503
2 Claims

ABSTRACT OF THE DISCLOSURE

An outdoor hydronic heating-cooling unit provides hot and chilled liquid to an indoor fan coil unit. The outdoor unit has a compression cycle refrigeration system for cooling a liquid heat exchange fluid. The heat exchange liquid is cooled by passing it through a finned spiral tube disposed within the refrigeration system suction line accumulator. The outdoor unit also includes a liquid heater with gas burner. A single pump is used to circulate heat exchange liquid between the indoor fan coil unit and the outdoor heating and cooling unit. The liquid heater is arranged above the chiller-accumulator within a single enclosure.

SUMMARY OF THE INVENTION

This invention relates to air-conditioning systems particularly of the type wherein water or other liquid fluid is used as a heat exchange medium for conducting heat between an outdoor heating and cooling unit and an indoor heat exchanger or fan coil unit.

It is an object of this invention to provide a low cost hydronic heating-cooling system which permits all but the indoor fan coil unit to be located external to the living or conditioned space.

Another object is to provide a combined liquid chiller and suction line accumulator.

A further object of this invention is to provide a unique liquid heater and chiller combination for supplying hot and chilled water to a fan coil unit within the conditioned space.

And still a further object of this invention is to provide within the combined heater and chiller unit, a unique arrangement of liquid chiller and heater specifically insulated for their respective purposes.

More specifically, this invention involves a refrigeration system having a suction line accumulator comprising: a hermetically sealed shell; a cup-shaped member disposed within said shell; a spiral tube disposed in a space intermediate said cup-shaped member and said shell and adapted to conduct a liquid to be cooled; a conduit adapted to conduct liquid refrigerant to said space intermediate said cup-shaped member and said shell; a refrigerant gas outlet tube extending into said cup-shaped member for conducting refrigerant vaporized by heat from said spiral tube.

DESCRIPTION OF THE DRAWING

The sole figure of the drawing schematically illustrates the hydronic heating-cooling split system which embodies the instant invention.

DETAILED DESCRIPTION

A hydronic heating-cooling split system 1 has an outdoor heating and cooling unit 2 and an indoor fan coil unit 3. Indoor fan coil unit 3 has a heat exchanger 4 and a fan 5 arranged to pass air within the conditioned space 6 in heat exchange relationship with heat exchanger 4 for purposes of heating or cooling the air within conditioned space 6. Outdoor heating and cooling unit 2 which is located external to the conditioned space 6 and preferably remote from the building containing space 6 has an external housing 7 with an internal vertical partition 8 dividing the space within housing 7 into first and second juxtaposed chambers 9 and 10 respectively.

Disposed within first chamber 9 is a refrigerant compressor 11, a refrigerant condenser 12, and a condenser fan 13 arranged to pass outdoor cooling air in heat exchange relationship with condenser 12. To this end housing 7 may be provided with louvered openings 14 and 15 for ingress and egress of the outdoor cooling air.

Within the lower portion of chamber 10 is a combined liquid chiller and refrigerant suction line accumulator 16. Chiller-accumulator 16 includes a hermetically sealed shell 60 having generally right circular cylindrical sides and dished top and bottom portions. A cup-like member 62 arranged with its open end at the top is disposed in spaced relation from the cylindrical walls of shell 60 and in spaced relation with the top and bottom of shell 60. An outlet tube 64 connected to the suction side of compressor 11 extends through the top portion of shell 60. The outlet tube 64 is U-shaped. One leg 66 of the tube 64 extends downwardly into cup-like member 62 adjacent the bottom thereof. The tube is provided with a bend 68 and a second leg 70 extends upwardly terminating in an open end 72 adjacent the upper portion of cup-like member 62. A small metering opening 74 is provided in the tube bend 68. A small pressure equalizing opening 76 is provided in the upper portion of leg 66.

A first spiral tube 78 is disposed inwardly of the walls of cup-shaped member 62 circumscribing the legs of outlet tube 64. One end of spiral tube 78 is connected to receive refrigerant liquid from the lower portion of condenser 12. The other end of spiral tube 78 is connected to a refrigerant throttling means 20 which has its outlet connected to communicate with the lower portion of shell 60 as by conduit 80. A second spiral tube 18 circumscribes cup-like member 62 and is disposed in the space intermediate cup-like member 62 and the cylindrical walls of shell 60. Tube 18 is provided with external fins preferably of the type formed integrally with tube 18.

Disposed within the upper portion of chamber 10 is a gaseous fuel burner 21 supplied with fuel from a gas conduit 22 by way of a solenoid operated valve 23 which is opened upon energization. A continuously operating pilot 24 is connected to conduit 22 upstream of valve 23. Suitable openings 25 in the sides of housing 7 are provided for ingress of combustion air to the second chamber 10. A suitable opening 26 in the top side of housing 7 is provided for egress of flue gas from the second chamber 10. Disposed immediately above and arranged to be heated by burner 21 is a liquid heater 27 comprised of a copper conduit 28 provided with external fins 29 as extended heat transfer surface. A liquid heater inlet conduit 30 communicates the upper end of spiral tube 18 with copper conduit 28 for the passage of liquid heat exchanger fluid serially through the spiral tube 18 of the chiller-accumulator 16 and the copper conduit 28 of liquid heater 27. The outlet of liquid heater 27 is connected by way of heater outlet conduit 31 to 3-way solenoid valve 32. A conduit 33 connects the upper end of spiral tube 18 of chiller-accumulator 16 to 3-way valve 32. The outlet of 3-way valve 32 connects to a heat exchange liquid supply conduit 34 for supplying liquid heat exchange fluid to heat exchanger 4. Valve 32 has a solenoid operator which actuates valve 32 to communicate conduits 33 and 34 when energized and to communicate conduits 31 and 34 when de-energized. A heat exchange liquid return conduit 35 connects the lower end of heat exchanger 4 with the lower end of spiral tube 18 of liquid chiller-accumulator 16. A pump 36 having an electric motor is disposed within return conduit 35 for circulating liquid heat exchange fluid to and from heat exchanger 4.

The chiller-accumulator 16 is cast in a body of polyurethane foam 37 for insulating the chiller-accumulator from other portions of the heating-cooling unit. The upper portion of the second chamber 10 confining burner 21 and liquid heater 27 is lined with a fiberglass insulator 38 having a fetallic foil inner liner 39 for purposes of retaining heat within the upper portion of the second chamber 10. A suitable control system 40 responsive to the temperature of the conditioned space 6 is provided for operating the hydronic heating-cooling split system as hereinafter described.

OPERATION

Let it be assumed that gas is supplied to conduit 22 and that pilot 24 is ignited. Upon closure of main switch 41 which connects control system 40 to power source 42, no circuit is energized if the temperature in the conditioned space is at the control point. However, as the temperature falls, thermostat 43 bridges contact 44 to establish a circuit energizing heating relay 45 whereupon contacts 46 and 47 are closed. The closure of contact 46 establishes a first circuit including power source 42, main switch 41, contact 46, and the motor of fan 5 whereby the air within the conditioned space 6 is circulated in heat exchange relationship with heat exchanger 4. The closure of contact 46 also establishes a second circuit including power source 42, main switch 41, contact 46, and the motor of pump 36 whereby the liquid heat exchange fluid is pumped serially through spiral tube 18, heater inlet conduit 30, copper conduit 28 of liquid heater 27, heater outlet conduit 31, 3-way valve 32, supply conduit 34, heat exchanger 4, to be returned to pump 36 via return conduit 35. The closure of contact 47 of relay 45 establishes a circuit including power source 42, main switch 41, contact 47, and solenoid valve 23 whereby valve 23 is opened to supply fuel gas to burner 21 which is ignited by pilot 24. The liquid passing within the copper conduit 28 acquires heat from burner 21 which is released in heat exchanger 4 to the air within the conditioned space being circulated by fan 5 thereby warming conditioned space 6. When the temperature in the conditioned space again reaches the control point theremostate 43 will break with contact 44 thereby de-energizing relay 45 thus opening contacts 46 and 47. The opening of contacts 46 and 47 interrupts the aforedescribed circuits there de-energizing the motor of fan 5, the motor of pump 36, and the solenoid valve 23 thus shutting off burner 21.

Should the temperature in the conditioned space exceed the control point, thermostat 43 will bridge contact 48 thereby energizing cooling relay 49 to close contacts 50 and 51. The closure of contact 50 establishes a circuit including power source 42, main switch 41, contact 50, and the motor of condenser fan 13 whereby cooling air from the outside is circulated over refrigerant condenser 12. The closure of contact 50 establishes a second circuit including power source 42, main switch 41, contact 50, and the motor of refrigerant compressor 11 whereby refrigerant is caused to circulate within refrigerant circuit 19. The compressed refrigerant gas discharged from refrigerant compessor 11 passes to refrigerant condenser 12 where it is cooled and condensed. The refrigerant from condenser 12 may be subcooled as it passes through first spiral tube 78 from whence it is conducted to throttling means 20. The relatively warm refrigerant in tube 78 serves to evaporate liquid refrigerant contained within cup-like member 62. The refrigerant is throttled to a substantially lower pressure as it passes through throttling means 20 and is conducted by way of conduit 80 at such substantially lower pressure to the lower portion of shell 60. The lower pressure refrigerant liquid passing into shell 60 from conduit 80 contacts external fins 82 of spiral tube 18. Heat is transferred from the liquid or water contained within spiral tube 18 through the fins 82 to the refrigerant liquid in the space intermediate cup-like member 62 and shell 60 thereby vaporizing the refrigerant liquid and causing it to move to the upper portion of shell 60 into the open end 72 of the U-shaped outlet tube 64.

Liquid refrigerant which is not vaporized by the heat from spiral tube 18 may spill over the rim of cup-like member 62 and collect in cup-like member 62. Liquid refrigerant within cup-like member 62 is vaporized by heat from the first spiral tube 78 and caused to enter the open end 72 of U-shaped outlet tube 64. Non-vaporizable liquid which may collect in cup-like member 62 such as lubricating oil as well as non-vaporized refrigerant may enter the small metering opening 74 and be drawn along with the refrigerant gas passing through outlet tube 64 on its way to the suction side of compressor 11. Pressure equalizing opening 76 merely serves to equalize the pressures within both legs of outlet tube 64 when compressor 11 is not operating so that large concentrations of liquid from cup-like member 62 cannot be drawn into the inlet of compressor 11.

The closure of contact 50 also establishes a third circuit including power source 42, main switch 41, contact 50, and 3-way solenoid valve 32. The energization of 3-way valve 32 places chiller outlet conduit 33 in direct communication with supply conduit 34. The closure of contact 51 establishes a first circuit including power source 42, main switch 41, contact 51, and the motor of pump 36 whereby the heat exchange liquid is circulated respectively through the spiral tube 18 of chiller-accumulator 16, chiller outlet conduit 33, 3-way solenoid valve 32, supply conduit 34, heat exchanger 4, and return conduit 35 to pump 36 to be recirculated. The closure of contact 51 also establishes a second circuit including power source 42, main switch 41, contact 51, and the motor of fan 5 whereby air within the conditioned spaced 6 is circulated in heat exchange relationship with heat exchanger 4. Thus heat from the conditioned space is transmitted via heat exchanger 4 to the heat exchange liquid which is then circulated to the chiller-accumulator 16 where the heat is transferred from spiral tube 18 to vaporize the liquid refrigerant within shell 60. Should the air within the conditioned space thus be sufficiently cooled to again reach the control point, thermostat 43 will break with contact 48 thereby de-energizing cooling relay 49 thus opening contacts 50 and 51 thereby de-energizing the aforedescribed circuits shutting off condenser fan 13, compressor 11, pump 36, fan 5, and de-energizing 3-way solenoid valve 32.

It should be noted that the chilled liquid from spiral tube 18 of chiller-accumulator 16 does not circulate through the liquid heater by reason of the operation of 3-way solenoid valve 32. The purpose of this arrangement is to avoid atmospheric condensation on liquid heater 27 which would drip onto burner 21 and cause possible corrosion as well as to avoid unnecessary heat gain as a result of natural convection about conduit 28 and to reduce the flow resistance of the circulating heat exchange liquid during the cooling cycle. However, it should be appreciated that if burner 21 is constructed of a non-corrosive material, or is placed in a position of protection from such condensate, 3-way solenoid valve 32 and chiller outlet conduit 33 could be eliminated whereby the circulation of the heat exchange liquid would be serially through spiral tube 18, liquid heater inlet conduit 30, liquid heater 27, and through conduits 31 and 34 to heat exchanger 4 under conditions of both heating and cooling.

It should also be appreciated that only the simplest of controls have been shown without conventional time delay devices and anticipators. If desired, the pump motor may be made to operate continuously.

Having now described the preferred but simplified embodiment of my invention, I contemplate that many changes may be made without departing from the scope or spirit of my invention and I accordingly desire to be limited only by the claims.

I claim:
1. In a refrigeration system, a suction line accumulator comprising: a hermetically sealed shell; a cup-shaped member disposed within said shell; a spiral tube disposed in a space intermediate said cup-shaped member and said shell and adapted to conduct a liquid to be cooled; a conduit adapted to conduct liquid refrigerant to said space intermediate said cup-shaped member and said shell; a refrigerant gas outlet tube extending into said cup-shaped member for conducting refrigerant vaporized by heat from said spiral tube; a conduit disposed within said cup-shaped member for conducting a refrigerant liquid at substantially higher pressure than the pressure of the refrigerant in the space intermediate said cup-shaped member and said shell; and means sealingly separating the interior of said conduit within said cup-shaped member from the interior space of said hermetically sealed shell.

2. A refrigeration system comprising: a refrigerant compressor; a refrigerant condenser connected to the discharge side of said refrigerant compressor; a hermetically sealed shell; a container disposed within said shell for trapping refrigerant liquid and lubricating oil therein; means for conducting refrigerant liquid from said condenser to a space intermediate said shell and said container; a heat exchange conduit disposed in said space for conducting a liquid fluid in heat exchange relationship with the liquid refrigerant within said space; and a conduit for conducting refrigerant gas from said shell to the suction side of said compressor; said means for conducting refrigerant liquid from said condenser to said space includes a heat exchange conduit within said container and a throttling means connected serially therewith downstream of said heat exchange conduit.

References Cited

UNITED STATES PATENTS

| | | | |
|---|---|---|---|
| 2,450,735 | 10/1948 | Millet | 62—394 X |
| 3,420,071 | 1/1969 | Bottun | 62—503 |

MEYER PERLIN, Primary Examiner

U.S. Cl. X.R.

62—333, 394, 513; 165—64